United States Patent Office 3,072,666
Patented Jan. 8, 1963

3,072,666
1-AMINO-3-(HYDROCARBONOXY)-2-PROPANOLS
Edward J. Watson, Jr., Norwich, N.Y., assignor to The Dow Chemical Company, Midland, Mich., a corporation of Delaware
No Drawing. Filed Mar. 20, 1961, Ser. No. 96,724
7 Claims. (Cl. 260—294.7)

This invention is directed to 1-amino-3-(hydrocarbonoxy)-2-propanols corresponding to the formula

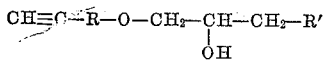

In this and succeeding formulae, R represents isopropylidene, secondary butylidene or cyclohexylidene; R' represents lower alkyl-amino, cyclohexyl-amino, phenyl-amino, N-lower alkyl-cyclohexylamino, N-lower alkyl-anilino or piperidyl. The expression "lower alkyl" is employed in the present specification and claims to refer to the alkyl radicals containing from 1–5 carbon atoms, inclusive. These new compounds are liquid materials which are somewhat soluble in many common organic solvents and of low solubility in water. The compounds are useful as parasiticides and herbicides for the control and killing of a number of species such as nematodes, *Alternaria solani*, pigweed, millet, coontail and Salvinia.

The new compounds may be prepared by reacting 1,2-epoxy-3-(hydrocarbonoxy)-propane corresponding to the formula

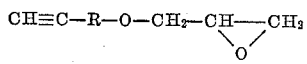

with a suitable amine compound (R'—H), i.e. diethyl amine, diphenylamine, propylamine, dicyclohexylamine, aniline and N-butyl-aniline. The reaction conveniently may be carried out in a liquid reaction medium such as tetrahydrofuran, benzene, toluene and hexane. The amounts of the reagents to be employed are not critical, some of the desired product being obtained when employing any proportion of the reagents. Where optimum yields are desired substantially equimolecular proportions of the propane and amine are employed. The reaction is somewhat exothermic and takes place smoothly at the temperature range of from 25° to 100° C. with the production of the desired addition products. The temperature may be controlled by regulating the rate of contacting the reactants and by external cooling. In carrying out the reaction, the 1,2-epoxy-3-(hydrocarbonoxy)-propane and amine compounds are mixed and contacted together in any convenient manner and the reaction mixture thereafter maintained for a period of time at a temperature of from 25° to 100° C. to complete the reaction. Upon completion of the reaction, the desired product may be separated by fractional distillation under reduced pressure.

The following examples merely illustrate the invention and are not to be construed as limiting.

*Example 1.—1-(Diethylamino)-3-(1'-Ethynyl-1'-Cyclohexyloxy)-2-Propanol*

1,2-epoxy-3-(1'-ethynyl-1'-cyclohexyl)-propane (180 grams; 1.0 mole) was added portionwise with stirring to 100 grams (1.37 moles) of diethylamine. During the addition, the temperature of the reaction mixture was raised to the boiling temperature and maintained thereat. The addition was carried out over a period of two hours. Following the reaction, the reaction mixture was fractionally distilled under reduced pressure to separate a 1-(diethylamino)-3-(1'-ethynyl-1'-cyclohexyloxy)-2-propanol product boiling at 148° C. at 4.4 millimeters pressure and having a density of 0.963 at 25°/4° C. and a refractive index n/D of 1.4754 at 25° C.

*Example 2.—1-(Diethylamino)-3-(1'-Ethyl-1'-Methylpropargyloxy)-2-Propanol*

1,2-epoxy-3-(1'-ethyl-1'-methylpropargyloxy)-propane (231 grams; 1.5 moles) was added portionwise with stirring to 120 grams (1.6 moles) of diethylamine. The addition was carried out over a period of 7 hours and at the boiling temperature of the reaction mixture and under reflux. Stirring was thereafter continued under the same temperature conditions for an additional two hours to complete the reaction. The reaction mixture was thereafter fractionally distilled under reduced pressure to separate a 1-(diethyl-amino)-3-(1'-ethyl-1'-methylpropargyloxy)-2-propanol product boiling at 80° C. at 0.2 millimeter pressure and having a density of 0.915 at 25°/4° C. and a refractive index n/D of 1.452 at 25° C.

*Example 3.—1-Piperidino-3-(1'-Ethynyl-1'-Cyclohexyloxy)-2-Propanol*

1,2-epoxy-3-(1'-ethynyl-1'-cyclohexyloxy)-propane (3.0 moles) was added portionwise with stirring to 255 grams (3 moles) of piperidine. During the addition, the temperature was raised to the boiling temperature and maintained thereat during the remainder of the addition which was carried out over 7 hours. Following the addition, the reaction mixture was maintained for two hours at the boiling temperature and under reflux to complete the reaction. The reaction mixture was then fractionally distilled under reduced pressure to separate a 1-piperidino-3-(1'-ethynyl-1'-cyclohexyloxy)-2-propanol product boiling at 169°–172° C. at 2.4 millimeters pressure and having a refractive index n/D of 1.4939 at 25° C.

*Example 4.—1-(Dicyclohexylamino)-3-(1',1'-Dimethyl propargyloxy)-2-Propanol*

1,2-epoxy-3-(1',1'-dimethylpropargyloxy)-propane (210 grams; 1.5 moles) was added portionwise with stirring to 278 grams (1.53 moles) of dicyclohexylamine dispersed in 375 milliliters of tetrahydrofuran. The addition was carried out over a period of 7 hours and at the boiling temperature of the reaction mixture and under reflux. Stirring was thereafter continued at the boiling temperature for an additional two hours and the reaction mixture thereafter fractionally distilled under reduced pressure to separate a 1-dicyclohexylamino-3-(1',1'-dimethylpropargyloxy)-2-propanol product as a liquid material. This product had a boiling point of 161° C. at 0.5 millimeter pressure and a refractive index n/D of 1.4896 at 25° C.

*Example 5.—1-(Dicyclohexylamino)-3-(1'-Ethynyl-1'-Cyclohexyloxy)-2-Propanol*

1,2-epoxy-3-(1'-ethynyl-1'-cyclohexyloxy)-propane (1 mole) was added portionwise with stirring to 185 grams (1 mole) of dicyclohexylamine dispersed in 250 milliliters of tetrahydrofuran. The addition was carried out at the boiling temperature of the reaction mixture and under reflux and over a period of 7 hours. Stirring was thereafter continued at the boiling temperature for two additional hours to insure completion of the reaction. The reaction mixture was then fractionally distilled under reduced pressure to separate a 1-(dicyclohexylamino)-3-(1'-ethynyl-1'-cyclohexyloxy)-2-propanol product boiling at 198° C. at 0.7 millimeters pressure and having a refractive index n/D of 1.5036 at 25° C.

*Example 6.—1-(Diethylamino)-3-(1',1'-Dimethyl-Propargyloxy)-2-Propanol*

1,2-epoxy-3-(1',1'-dimethylpropargyloxy)-propane (1.5 moles) was added portionwise with stirring to 1.6 moles of diethylamine. The addition was carried out over a period of 7 hours and at the boiling temperature of the reaction mixture and under reflux. Following the addition, the reaction mixture was stirred two hours under the same temperature conditions to insure completion of the reaction, and thereafter fractionally distilled under reduced pressure to separate a 1-(diethylamino)-3-(1',1'-dimethylpropargyloxy)-2-propanol product as a liquid material. This product had a boiling point of 80° C. at 0.7 millimeters pressure, and a density of 0.916 at 25°/4° C. and a refractive index n/D of 1.4490 at 25° C.

*Example 7.—1-(N-Methyl-Anilino)-3-(1'-Ethynyl-1'-Cyclohexyloxy)-2-Propanol*

1,2-epoxy-3-(1'-ethynyl-1'-cyclohexyloxy)-propane (180 grams) was added portionwise with stirring to 115 grams 1.5 mole) of N-methyl-aniline dispersed in 250 milliters of tetrahydrofuran. The addition was carried out over a period of 7 hours and at the boiling temperature of the reaction mixture and under reflux. Stirring was thereafter continued for two additional hours at the same temperature to insure completion of the reaction. The reaction mixture was thereafter fractionally distilled under reduced pressure to separate a 1-(N-methyl-anilino)-3-(1'-ethynyl-1'-cyclohexyloxy)-2-propanol product as a liquid material boiling at 171° C. at 1.1 millimeters pressure and having a refractive index n/D of 1.5455 at 25° C.

*Example 8.—1-(Dicyclohexylamino)-3-(1'-Ethyl-1'-Methylpropargyloxy)-2-Propanol*

1,2-epoxy-3-(1'-ethyl-1'-methylpropargylyoxy)-propane (170 grams; 1.1 moles) was added slowly portionwise with stirring to 270 grams (1.53 moles) of dicyclohexylamine dispersed in 375 milliliters of tetrahydrofuran. The addition was carried out over a period of 7 hours and at the boiling temperature of the reaction mixture and under reflux. Stirring was thereafter continued for an additional two hours at the boiling temperature and the reaction mixture then fractionally distilled under reduced pressure to separate a 1-(dicyclohexylamino)-3-(1'-ethyl-1'-methylpropargyloxy)-2-propanol product as a liquid material. This product had a boiling point of 178° C. at 0.9 millimeters pressure and a refractive index n/D of 1.4901 at 25° C.

*Example 9.—1-(N-Methyl-Anilino)-3-(1'-Ethyl-1'-Methylpropargyloxy)-2-Propanol*

1,2-epoxy-3-(1'-ethyl-1'-methylpropargyloxy) - propane (1.5 moles) was added portionwise with stirring to 173 grams (1.6 moles) of N-methyl-aniline dispersed in 375 milliliters of tetrahydrofuran. The addition was carried out over a period of 7 hours and at the boiling temperature of the reaction mixture and under reflux. Stirring was thereafter continued for two additional hours under the same reaction conditions and the reaction mixture thereafter fractionally distilled under reduced pressure to separate a 1-(N-methylanilino)-3-(1'-ethyl-1'-methylpropargyloxy)-2-propanol product as a liquid material. This product had a boiling point of 174° C. at 1.5 millimeters pressure, and a density of 1.029 at 25°/4° C. and a refractive index n/D of 1.5278 at 25° C.

*Example 10.—1-Piperidino-3-(1'-Ethyl-1'-Methylpropargyloxy)-2-Propanol*

1,2-epoxy-3-(1'-ethyl-1'-methylpropargyloxy) - propane (1.5 moles) was added portionwise with stirring to 135 grams (1.6 moles) of piperidine. The addition was carried out over a period of 7 hours and a temperature of from 25° to 100° C. Following the addition, the reaction mixture was maintained for an additional two hours at a temperature of 100° C., and thereafter fractionally distilled under reduced pressure to separate a 1-piperidino-3-(1'-ethyl-1'-methylpropargyloxy)-2-propanol product as a liquid material. This product had a boiling point of 96° C. at 0.2 millimeters pressure, and a density of 0.965 at 25°/4° C. and a refractive index n/D of 1.4728 at 25° C.

In a similar manner, other products of the present invcention are prepared as follows:

1-(amylamino) - 3 - (1' - ethynyl-1'-cyclohexyloxy)-2-propanol by reacting together 1,2-epoxy-3-(1'-ethynyl-1'-cyclohexyloxy)-propane and amylamine.

1-(methylamino)-3-(1'-ethynyl-1' - cyclohexyloxy) - 2-propanol by reacting together 1,2-epoxy-3-(1'-ethynyl-1'-cyclohexyloxy)-propane and methylamine.

1-(cyclohexylamino)-3-(1'-ethynyl-1' - cyclohexyloxy)-2-propanol by reacting together 1,2-epoxy-3-(1'-ethynyl-1'-cyclohexyloxy)-propane and cyclohexylamine.

1-anilino-3-(1'-ethynyl-1'-cyclohexyloxy) - 2 - propanol by reacting together 1,2-epoxy-3-(1'-ethynyl-1'-cyclohexyloxy)-propane and aniline.

1-(N-butyl-anilino)-3-(1'-ethynyl-1'-cyclohexyloxy) - 2-propanol by reacting together 1,2-epoxy-3-(1'-ethynyl-1'-cyclohexyloxy)-propane and N-butylaniline.

1-(dimethylamino)-3-(1'-ethynyl-1'-cyclohexyloxy)-2-propanol by reacting together 1,2-epoxy-3-(1'-ethynyl-1'-cyclohexyloxy)-propane and dimethylamine.

1-(dibutylamino)-3-(1'-ethynyl-1' - cyclohexyloxy) - 2-propanol by reacting together 1,2-epoxy-3-(1'-ethynyl-1'-cyclohexyloxy)-propane and dibutylamine.

1 - (diphenylamino) - 3-(1'-ethynyl-1'-cyclohexyloxy)-2-propanol by reacting together 1,2-epoxy-3-(1'-ethynyl-1'-cyclohexyloxy)-propane and diphenylamine.

1 - (N - propyl - cyclohexylamino) - 3-(1'-ethynyl-1'-cyclohexyloxy)-2-propanol by reacting together 1,2-epoxy-3-(1'-ethynyl-1'-cyclohexyloxy)-propane and N-propylcyclohexylamine.

1 - (N - methyl - cyclohexylamino)-3-(1',1'-dimethylpropargyloxy)-2-propanol by reacting together 1,2-epoxy-3-(1',1'-dimethylpropargyloxy)-propane and N-methylcyclohexylamine.

1 - anilino - 3 - (1',1' - dimethylpropargyloxy) - 2-propanol by reacting together 1,2-epoxy-3-(1',1'-dimethylpropargyloxy)-propane and aniline.

1 - cyclohexyl - 3-(1'-ethyl-1'-methylpropargyloxy)-2-propanol by reacting together 1,2-epoxy-3-(1'-ethyl-1'-methylpropargyloxy)-propane and cyclohexylamine.

1 - (diphenylamino) - 3 - (1',1' - dimethylpropargyloxy)-2-propanol by reacting together 1,2-epoxy-3-(1',1'-dimethylpropargyloxy)-propane and diphenylamine.

The novel products of the present invention are useful as parasiticides and herbicides. For such uses, the products are dispersed on an inert finely divided solid and employed as dusts. Such mixtures also may be dispersed in water with or without the aid of a surface active agent and the resulting aqueous suspensions employed as sprays. In other procedures, the products are employed as active constituents in solvent solutions, oil-in-water or water-in-oil emulsions or aqueous dispersions. In representative operations, the treatment of soil with 1-(N-methyl - anilino) - 3(1' - ethynyl - 1'-cyclohexyloxy)-2-propanol at a dosage of 50 pounds per acre gives complete inhibition and kills of the germinant seeds and emerging seedlings of German millet. In further operations, aqueous compositions containing 300 parts per million by weight of 1-piperidino-3-(1'-ethynyl-1'-cyclohexyloxy)-2-propanol gives substantially complete kills of tomato early blight (*Alternaria solani*). In additional operations, the treatment of soil with 1-(diethylamino)-3-(1'-ethynyl-1'-cyclohexyloxy)-2-propanol at a dosage of 50 pounds per acre gives substantially complete controls of root knot nematodes. In further operations, aqueous compositions containing 500 parts per million by weight of 1-(dicyclohexylamino)-3-(1'-ethyl-1'-methylpropargyloxy)-2-propanol give 100 percent kills of mites and aqueous compositions containing 10 parts of the same propanol product give 100 percent controls of coontail.

The 1,2-epoxy-3-(hydrocarbonoxy)-propanes employed as starting materials in accordance with the present invention are prepared by reacting a suitable alcohol (CH≡C—R—OH) with epichlorohydrin in stannic chloride as catalyst to produce an intermediate 1-chloro-3-(hydrocarbonoxy)-2-propanol (CH≡C—R—O—CH₂CHOHCH₂Cl)

This intermediate is then reacted with aqueous alkali metal hydroxide (sodium hydroxide) to obtain the desired starting product as a liquid material.

I claim:

1. A compound of the formula

CH≡C—R—O—CH₂—CH—CH₂—R'
                |
                OH wherein R represents a member of the group consisting of isopropylidene, secondary butylidene and cyclohexylidene and R' represents a member of the group consisting of lower alkyl-amino, cyclohexyl-amino, phenyl-amino, N-lower alkyl-cyclohexylamino, N-lower alkyl-anilino and piperidyl.

2. 1 - (N - methylanilino) - 3 - (1'-ethynyl-1'-cyclohexyloxy)-2-propanol.

3. 1 - (diethylamino) - 3 - (1' - ethynyl - 1' - cyclohexyloxy)-2-propanol.

4. 1 - piperidino - 3 - (1' - ethynyl - 1' - cyclohexyloxy)-2-propanol.

5. 1 - (dicyclohexylamino) - 3 - (1' - ethyl - 1'-methylpropargyloxy)-2-propanol.

6. 1 - (diethylamino)-3-(1',1'-dimethylpropargyloxy)-2-propanol.

7. 1 - (dicyclohexylamino) - 3 - (1',1' - dimethylpropargyloxy)-2-propanol.

No references cited.